R. B. DISBROW.
MILKING APPARATUS.
APPLICATION FILED OCT. 6, 1917.
1,308,053.
Patented July 1, 1919.
2 SHEETS—SHEET 2.
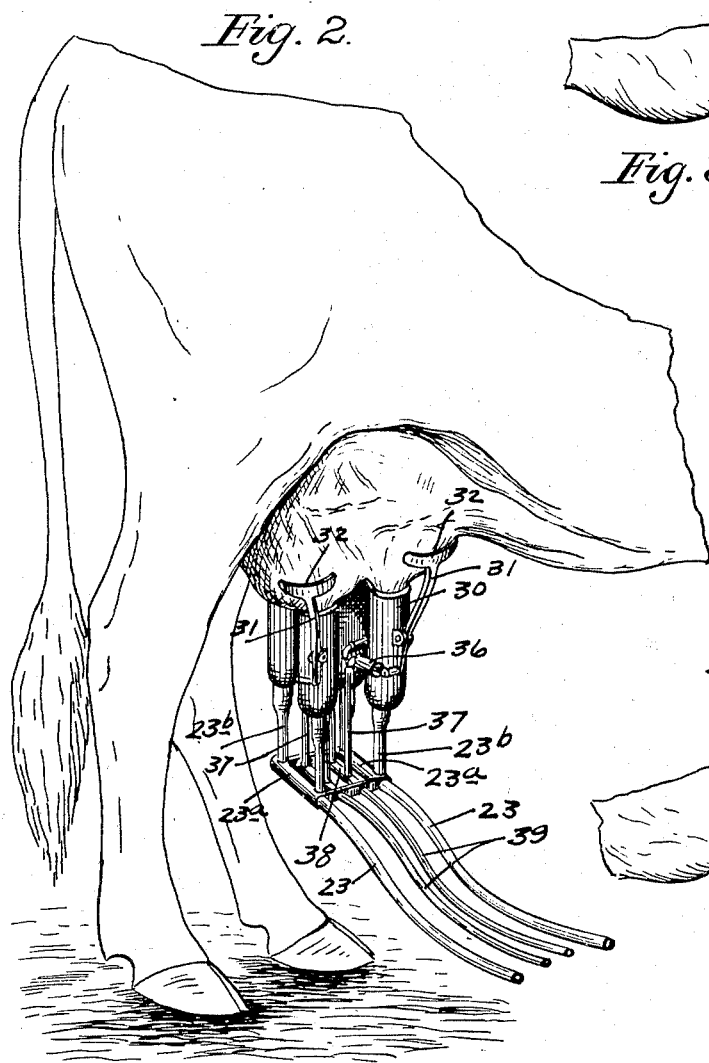
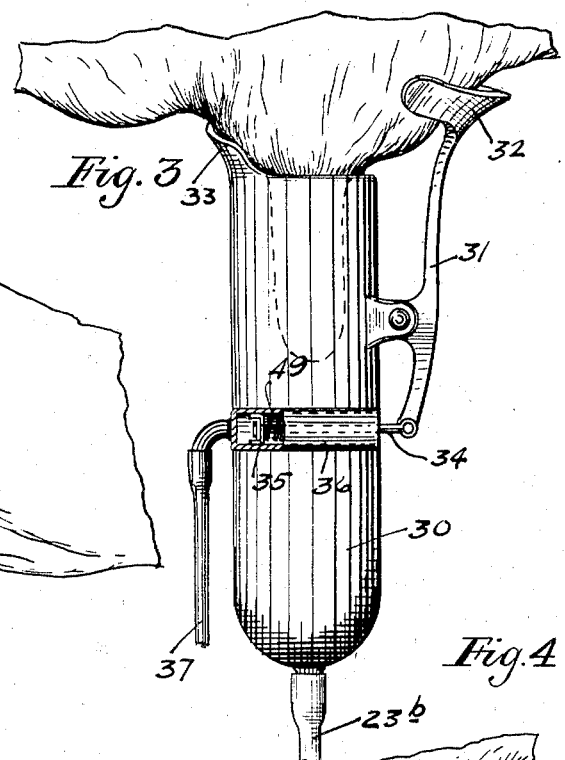
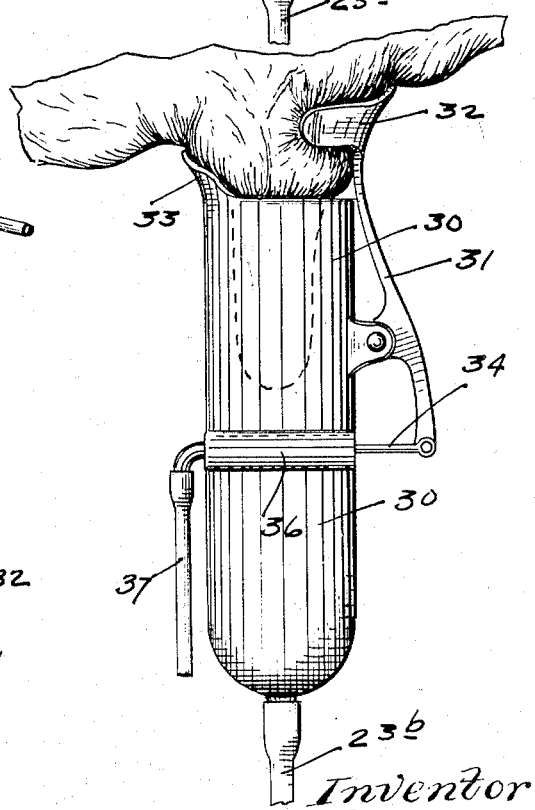
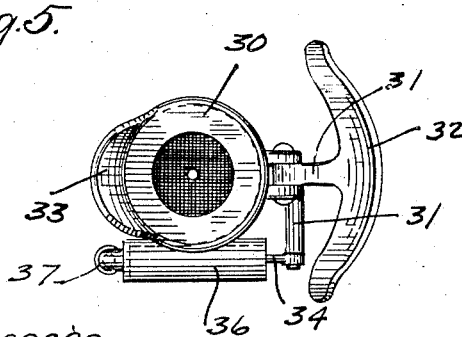
Inventor
R. B. DISBROW
By his Attorneys

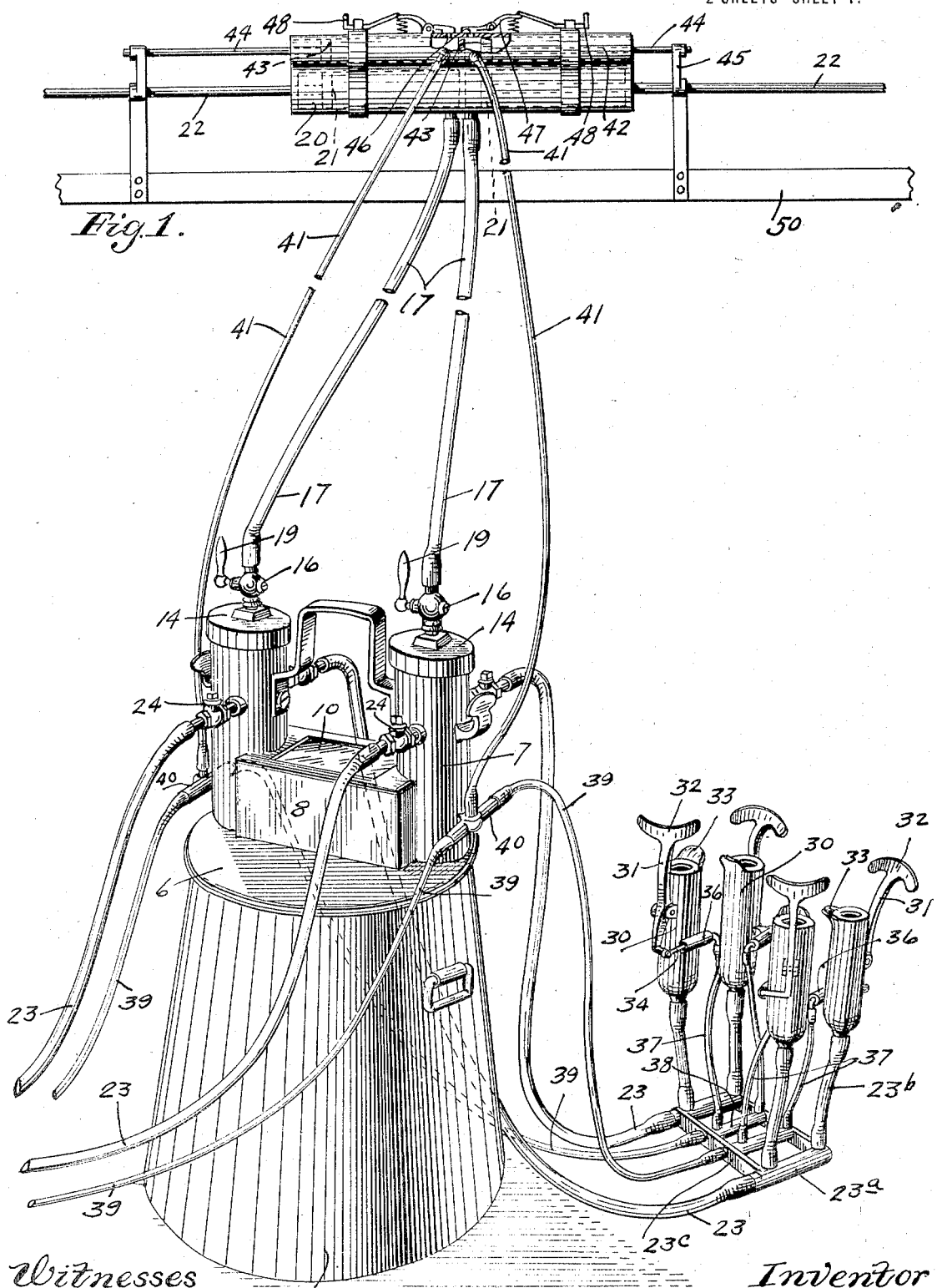

UNITED STATES PATENT OFFICE.

REUBEN B. DISBROW, OF ST. PAUL, MINNESOTA.

MILKING APPARATUS.

1,308,053.           Specification of Letters Patent.      Patented July 1, 1919.

Application filed October 6, 1917. Serial No. 195,163.

*To all whom it may concern:*

Be it known that I, REUBEN B. DISBROW, a citizen of the United States, residing at St. Paul, in the county of Ramsey and State of Minnesota, have invented certain new and useful Improvements in Milking Apparatus; and I do hereby declare the following to be a full, clear, and exact description of the invention, such as will enable others skilled in the art to which it appertains to make and use the same.

My present invention relates to milking apparatus and has for its object to provide, as an auxiliary device, or improved feature thereof, what may be broadly designated as a stripper.

In milking apparatus, it is the universal custom to employ teat cups of some form which are subject to the action of partial vacuum which is usually delivered thereto in pulsations which produce the milking action. Teat cups, moreover, have resilient inner walls which, by expansion and contraction, approximate to some extent, the hand milking action, but, nevertheless, totally fail to produce an action which, in hand milking operation, is performed to complete the milking action, and which is known as "stripping."

My improved automatic stripping device, in the preferred arrangement, as preferably designed, is arranged to be thrown into and out of action, at will, and regardless of whether or not the pulsating action is being produced in the teat cup proper, and it serves to complete the milking action, or, in other words, to do what is known as stripping, so that no hand milking action, whatever, is required to finish up the job of milking the cow.

A preferred form of the stripper applied to the milking apparatus of the character disclosed in my pending application, S. N. 169,914, filed of date, May 21, 1917, and entitled "Milking apparatus," is illustrated in the accompanying drawings, wherein like characters indicate like parts throughout the several views.

Referring to the drawings:

Figure 1 is a perspective view of the apparatus having my improved stripping device applied thereto;

Fig. 2 is a perspective view showing the teat cups and strippers applied to a cow;

Figs. 3 and 4 are views in side elevation showing teat cups and strippers and illustrating the action of the latter; and Fig. 5 is a plan view of the teat cup and stripper shown in the various other views.

In the form of milking apparatus illustrated, the milk can or receptacle A has a detachable cover 6, which need not fit the same tightly, but may rest loosely thereon. This cover 6 affords a base for upright so-called vacuum chambers 7 which, at their lower portions, deliver into a vacuum chamber 8, which, in turn, delivers through the cover 6 directly into the can. The chamber 7 is shown as provided with a glass top plate 10 through which the operation of valve mechanism may be observed. Within the chamber 8 is suitable check valves not herein shown, but which may be of the character disclosed in my application above identified, or in my companion application S. N. 195,162 filed of even date herewith entitled "Valve mechanism for milking apparatus."

The vacuum chambers 7, at their upper extremities, are shown as provided with caps 14 applied thereto with fluid-tight joints, and provided with metallic nipples 16 that are connected to flexible pulsation tubes 17, and, as shown, with normally open cut-off valves 19. The pulsation tubes 17 are connected to the opposite piston chambers of a double-ended cylinder 20, in which pistons 21 are arranged to work. These pistons 21 have projecting rods 22, which, in practice, will be connected for common reciprocatory movements, so that they will produce in the two cylinders, and hence in the two vacuum chambers 7, suction or partial vacuum and pressure in alternate order.

A milk tube is connected to each vacuum chamber 7 and, as shown, each such milk tube comprises a flexible hose 23 and a valve casing 24. In the preferred arrangement, each vacuum chamber 7 will usually be provided with the said milk tubes connected in duplicate so as to provide for the simultaneous milking of two cows into the one can.

The teat cups, of which there are preferably two groups of four each, are indicated, as entireties, by the numeral 30. Of each group of four teat cups, two are connected to one of the tubes from one of the vacuum chambers 7 and the other two are connected to one of the tubes from the other of said vacuum chambers. As shown, the milk tubes 23, at their free ends, are provided with metallic head tubes 23ª, that are tied together in pairs, and to which the said teat cups are directly connected in the manner stated, by means of short flexible tubes 23ᵇ. As shown, the tubes 23ª are rigidly connected by cross bars 23ᶜ.

In milking apparatus of the character above described, under outward movements of the pistons 21, partial vacuum will be produced in the vacuum chambers 7, in alternate order, and, as is obvious, when partial vacuum is produced in one of these chambers, partial vacuum will also be produced in the teat cups connected thereto. In the arrangement where the two teat cups of one group are connected to one vacuum chamber 7, and the other two teat cups are connected to the other vacuum chamber 7, it, of course, follows, that the partial vacuum or suction will be alternated in the two pairs of teat cups of the same group. This keeps the group in position without the use of straps, or in other words, prevents the group of teat cups from falling from position when the pressure is produced in one or the other of the pair of teat cups. Obviously, pressure equaling, or exceeding atmospheric pressure, will be alternately produced in the so-called vacuum chamber 7, and in the connected teat cups under inward movements of the pistons 21.

Milking apparatus such as that just described in detail has, in practice, been found efficient for milking cows, except that it did not perform the "stripping" or finishing-up part of the milking operation.

My improved stripping device or means is capable of a wide range of modification, but what is at present thought to be the preferred form thereof, comprises as follows:

To each teat cup 30 is intermediately pivoted a stripper lever 31, the outer end of which projects beyond the teat cup and is terminated in a sectional stripper head 32 that is arranged to engage the udder of the cow at the base of the teat (see particularly Figs. 2 and 4). Preferably, each teat cup 30, on its side opposite to the stripper head 32, is provided with a projecting so-called stripper flange 33 that is also arranged to engage the cow's udder adjacent to the teat, and to oppose the pressure produced by the stripper head 32. The inner end of the lever 31 is connected to the projecting stem 34 and small piston 35 that works in a small cylinder 36, extended transversely of and secured to one side of the teat cup. From each cylinder 36 is extended a small flexible air tube or hose 37. These air tubes 37 are connected in pairs to metallic tubes 38 rigidly supported by cross bars 23ᶜ (see Fig. 1). The tubes 38 are connected by small vertical tubes or hose 39, as shown, to pronged tubular couplings 40 secured one on each of the vacuum chambers 7. Inasmuch as this apparatus is designed for milking two cows at the same time, there are, as shown, two tubes 39 connected to each tube coupling 40.

An air tube or hose 41 extends from each of the two tube couplings 40, and the extended ends of these air tubes 41 are connected to the compression ends of the small auxiliary cylinders 42, which, as shown, are extended longitudinally of and rigidly connected to the respective cylinders 20. Working in the auxiliary cylinders 42 are pistons 43, the stems 44 of which project, and are connected by brackets 45 to the corresponding main piston rods 22. It should be here noted that the right hand pistons 21 and 43 when moved toward the left, simultaneously produce air pressure while the left hand pistons 21—43 produce partial vacuum in the left hand cylinders 20. The reverse of this statement is also, of course, true.

The stripping action is produced by movement of the stripper lever 31 from the position shown in Fig. 3 into the position shown in Fig. 4, and by repetition of this movement. The squeezing action above noted should take place while there is partial vacuum, or suction in the corresponding teat cup; and to accomplish this, as will be noted, by reference to Fig. 1, those teat cups 30 that are connected, for example, to the right hand vacuum chamber 7, and from thence, to the right hand main cylinder 20, have their cylinders 36 of their stripping devices connected to the left hand auxiliary cylinder 42.

To prevent excessive air pressure in the cylinders 36, and hence, excessive pressure of the stripper lever on the cow's udder, the auxiliary cylinders 42, in their compression ends, are provided with small air ports 46 that are normally closed by spring-pressed levers 47 that operate as check valves to permit a discharge of air from the cylinders 42 but to prevent an inflow of air through said ports.

It is desirable that efficient means be provided, whereby, at will, the stripping mechanism may be thrown into and out of action. This may be accomplished in a good many ways, but as an illustration of one means, I have shown sliding valve retainers 48 located on the cylinders 42 and adapted, when slid inward, to engage the free ends of the lever valves 46 and hold the same in open positions, so that air can freely flow both inward and outward through the ports 46. This will prevent the varying pressure from being produced in the cylinders 36 of the pulsating mechanism. To normally hold the stripper levers 31 in their retracted positions shown in Fig. 3, coiled springs 49 are placed in the cylinders 36 and compressed between one end thereof and the piston head 35.

In Fig. 1, the numeral 50 indicates a reciprocating bar to which the piston rods 22 are connected for common reciprocatory movement.

The operation of the stripper mechanism is thought to have been made clear from the foregoing, but it may be further added that in the cow's udder, at the base of or just above the teats, are milk pockets or sacks, which, at the final termination of the milking operation require to be emptied by stripping or downward pressure. The squeezing action produced on the udder at the base of the teat and at, or above the milk pocket or sack, serves to throw the milk down into the teat, and from the teat, the milk will be drawn by the action of the teat cup proper.

It is also important to note that the stripping device will be thrown into action before the suction or partial vacuum has been produced in the teat cup. This is due to the fact that the teat cups and cylinders of the pulsating devices are cross connected, as already described, and to the fact that when the cylinder on one side, which is connected to a particular teat cup, makes its suction stroke, it requires about one-half of such movement before it produces the partial vacuum or suction, while the cylinder, which produces the pressure necessary to operate the stripper of the particular teat cup, will be given pressure at the initial part of such movement.

Usually, it will not be desirable to throw the stripper into action at the beginning of the milking operation, nor until the milking operation has been nearly completed. However, the time of throwing the stripper into action will depend largely on the manner in which the cow gives down the milk, and in milking some cows, the stripper will be found useful nearly, or quite throughout the milking operation.

The so-called stripper operates as a highly efficient auxiliary milking device and will usually be employed in conjunction with the milking action produced in the teat cups proper, but it is possible to operate the stripping device while the teat cups are cut out of action, by closing of the valves 19.

The stripping device, the preferred form of which is here illustrated, is thought to be broadly new and it is my intention to herein broadly claim the same.

What I claim is:

1. In a milking apparatus, a group of teat cups and a corresponding group of strippers and coöperating stripper actuating devices, the said strippers operating independently adjacent to the upper portions of the respective teat cups.

2. In a milking apparatus, a teat cup having a stripper lever and lever actuating means applied thereto, said lever having a stripper head engageable with the cow's udder immediately above said teat cup, the said teat cup having a projecting stripper flange engageable with the cow's udder in opposition to said presser head.

3. In a milking apparatus, the combination with teat cups and means for producing pressure pulsations therein, of stripper devices engageable with the cow's udder immediately above said teat cups, and means for causing pressure operations of said stripper devices while the corresponding teat cups are subjected to partial vacuum or suction.

4. In a milking apparatus, the combination with a group of four teat cups connected in pairs of two, stripper devices applied to said teat cups and operative on the cow's udder immediately above said teat cups, means for producing partial vacuum and pressure in the two pairs of teat cups in alternate order, and means for imparting pressure operations to the said stripper devices, while the corresponding teat cups are subject to partial vacuum or suction.

5. In a milking apparatus, the combination with vacuum chambers arranged to deliver into a milk can, or the like, means for producing partial vacuum and pressure in said vacuum chambers in alternate order, a group of teat cups connected in pairs of two, the one pair being connected to one of said vacuum chambers and the other pair being connected to the other vacuum chamber, stripper devices applied to said teat cups and engageable to the cow's udder above the corresponding cups, and means for imparting pressure operations to said stripper device at times when the corresponding teat cups are subject to partial vacuum.

6. In a milking apparatus, the combination with a teat cup, of a stripper lever pivoted thereon, a small cylinder secured to said teat cup, a small piston working in said cylinder and connected to said stripper lever, and means for producing variable air pressure in said cylinder and in said teat cup.

In testimony whereof I affix my signature in presence of two witnesses.

REUBEN B. DISBROW.

Witnesses:
CLARA DEMAREST,
BERNICE G. BAUMANN.